US008871135B2

(12) United States Patent
Hausladen et al.

(10) Patent No.: US 8,871,135 B2
(45) Date of Patent: Oct. 28, 2014

(54) LABELER AND A LABELING METHOD FOR LABELING PLASTIC BOTTLES IN A BLOW MOLD, IN PARTICULAR IN A ROTARY BLOW MOLDER

(75) Inventors: Wolfgang Hausladen, Moetzing (DE); Christian Popp, Regensburg (DE); Werner Britten, Kehlheim (DE)

(73) Assignee: Krones AG, Neutraubling (DE)

( * ) Notice: Subject to any disclaimer, the term of this patent is extended or adjusted under 35 U.S.C. 154(b) by 736 days.

(21) Appl. No.: 13/006,638

(22) Filed: Jan. 14, 2011

(65) Prior Publication Data
US 2011/0180974 A1    Jul. 28, 2011

(30) Foreign Application Priority Data
Jan. 25, 2010  (DE) .......................... 10 2010 001 184

(51) Int. Cl.
B29C 49/24 (2006.01)
B65C 3/00 (2006.01)
B29C 49/02 (2006.01)
B29C 49/36 (2006.01)

(52) U.S. Cl.
CPC ............. B29C 49/24 (2013.01); B29C 49/2408 (2013.01); B29C 2049/021 (2013.01); B29C 2049/2433 (2013.01); B65C 3/00 (2013.01); B29C 49/36 (2013.01); B29B 2911/14313 (2013.01); B29C 2049/2422 (2013.01); B29C 2049/2443 (2013.01); B29C 2049/2449 (2013.01); B29C 2049/2412 (2013.01); B29C 49/02 (2013.01)
USPC ............ 264/523; 264/509; 264/516; 425/504

(58) Field of Classification Search
USPC ............................ 264/509, 516, 523; 425/504
See application file for complete search history.

(56) References Cited

U.S. PATENT DOCUMENTS

| 2,601,700 A | 7/1952 | Pinsky et al. |
|---|---|---|
| 3,194,857 A | 7/1965 | White |
| 3,438,085 A | 4/1969 | Larkin |
| 3,801,689 A | 4/1974 | Langecker |
| 4,605,462 A | 8/1986 | Lehner |

(Continued)

FOREIGN PATENT DOCUMENTS

| CH | 509864 A | 7/1971 |
|---|---|---|
| CN | 1635947 A | 7/2005 |

(Continued)

OTHER PUBLICATIONS

Krones AG., DE 198 06 647 A1, Machine Translation, Aug. 19, 1999.*

(Continued)

*Primary Examiner* — Galen Hauth
(74) *Attorney, Agent, or Firm* — Marshall, Gerstein & Borun LLP

(57) ABSTRACT

A labeler for in-mold labeling of plastic bottles as well as to a labeling method for use of the labeler, including that a transfer star wheel and a transfer device of the labeler move the preforms and the labels in a transfer region towards one another in such a way that a respective label is only affixed to a circumferential subarea of a perform. In this manner, the label can be inserted in the blow mold in a particularly fast and reliable manner and excessive stretching of the label during blow molding can be avoided.

19 Claims, 4 Drawing Sheets

(56) References Cited

U.S. PATENT DOCUMENTS

| | | | |
|---|---|---|---|
| 4,708,630 A | 11/1987 | Hammond | |
| 5,266,149 A | 11/1993 | Collette et al. | |
| 5,551,860 A | 9/1996 | Budzynski et al. | |
| 5,556,648 A * | 9/1996 | Budzynski et al. | 425/150 |
| 6,649,119 B2 | 11/2003 | Dunlap et al. | |
| 2002/0166833 A1 | 11/2002 | Shelby et al. | |
| 2004/0226392 A1 | 11/2004 | McNally | |
| 2010/0163164 A1 * | 7/2010 | Deonarine et al. | 156/229 |

FOREIGN PATENT DOCUMENTS

| | | | |
|---|---|---|---|
| DE | 1479083 A1 | 2/1969 | |
| DE | 1479322 A1 | 5/1969 | |
| DE | 2135406 A1 | 2/1973 | |
| DE | 19806647 A1 | 8/1999 | |
| EP | 0098351 A2 | 1/1984 | |
| EP | 1543939 A2 | 6/2005 | |
| EP | 1810813 A2 | 7/2007 | |
| EP | 2082966 A2 | 7/2009 | |
| WO | WO-0078526 A1 | 2/2000 | |
| WO | WO-02090088 A3 | 4/2004 | |
| WO | WO 2008088210 A1 * | 7/2008 | |

OTHER PUBLICATIONS

Chinese Office Action for 201110027674.7, dated Jul. 4, 2012.
"Agent QC," Sensor Wireless Inc., Industry IDS, Inc., 2011, http://www.idspackaging.com/packaging/us/agent_qc/1931/products.html.
European Search Report for EP10194951, dated Oct. 18, 2012.
German Search Report for 102010001184.3 mailed Mar. 16, 2012.

* cited by examiner

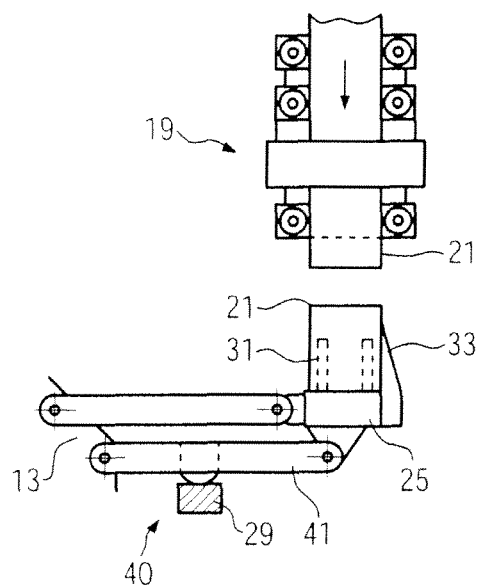
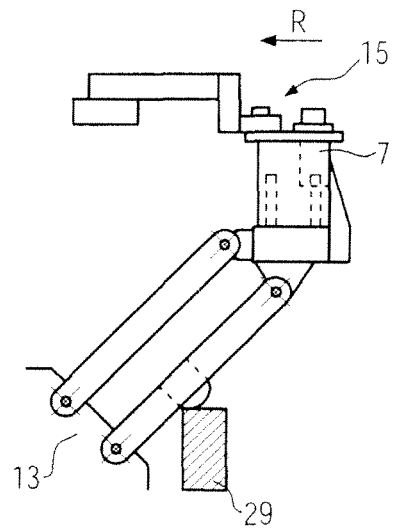
FIG. 3a  FIG. 3b
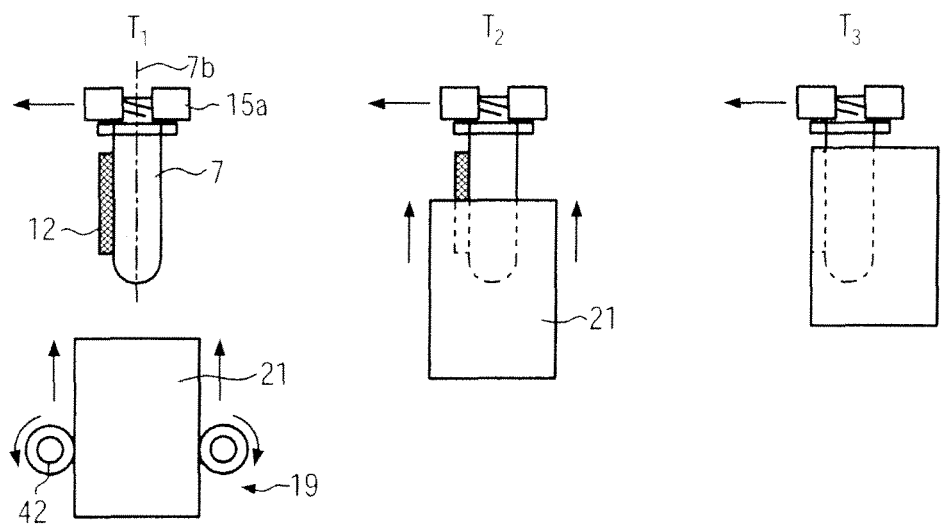
FIG. 4

LABELER AND A LABELING METHOD FOR LABELING PLASTIC BOTTLES IN A BLOW MOLD, IN PARTICULAR IN A ROTARY BLOW MOLDER

CROSS-REFERENCE TO RELATED APPLICATION

The present application claims the benefit of priority of German Application No. 102010001184.3, filed Jan. 25, 2010. The entire text of the priority application is incorporated herein by reference in its entirety.

FIELD OF THE DISCLOSURE

The disclosure relates to a labeler for in-mold labeling of plastic bottles as well as to a labeling method for use of the labeler.

BACKGROUND

As is generally known, plastic bottles can be already be labeled in the course of the production process through so-called in-mold labeling (IML) by introducing the labels in the blow mold before blow molding is executed. To this end, the label is positioned by means of grippers on the inner wall of the opened blow mold, as described in U.S. Pat. No. 6,649, 119 B2, U.S. Pat. No. 5,266,149 A and WO 00 785 26 A1 for rotary blow molders. Transfer star wheels with grippers are, however, technically complicated. Non-rotating, clocked transfer systems do not achieve the manufacturing efficiency demanded. In addition, there is a need for a device that can easily be integrated in existing blow molder such that it takes up little space.

Hence, US 2002/0166833 A1 and DE 2135406 A suggest as an alternative that sleeve-shaped labels should be pushed onto or shrunk onto a preform, and DE 198 06 647 A1 additionally suggests that a flat label section should be applied to the preform by winding and transferred to a blow molding carousel via a transfer star wheel. In the case of these methods the label is, however, substantially stretched together with the preform and the suitability of these methods for lettered labels is therefore very limited.

Furthermore, EP 0098351 A2 and U.S. Pat. No. 4,708,630 A disclose blow molders in which flat labels are fixed, at the outlet of an extruder, to an unfinished bottle by pressing them onto the just extruded, still plastically deformable sleeve of the unfinished bottle. This method is, however, not suitable for use with preforms prefabricated by injection molding.

The introduction of self-gluing labels into the blow mold with the aid of a carrier strip conducted through or along the blow mold is known e.g. from CH 509864 A and DE 1479083 A; the labels can here be separated from the carrier strip by punching them out or by removing them at a peel-off edge. This solution, however, limits the design flexibility as regards mold construction and bottle design, it causes problems when the carrier strips are being exchanged, and it is inflexible and technically complicated, since separate supply units are required for the individual blow molds.

The labeling of bottles with the aid of print heads integrated in the blow molds is described e.g. in DE 1479322 A1, U.S. Pat. No. 2,601,700 A or U.S. Pat. No. 3,438,085 A. However, this solution is not suitable for all kinds of bottle designs either. It is also disadvantageous insofar as at least one print head is required for each blow mold, printing qualities and/or printing formats are restricted, and the dyes must be handled at the blow molder.

SUMMARY OF THE INVENTION

It is one aspect of the present disclosure to provide a device and a method for in-mold labeling of plastic bottles with high process reliability and a high throughput of bottles, without the above-mentioned drawbacks.

This aspect is achieved in that a transfer star wheel and a transfer device of the labeler move the preforms and the labels in a transfer region towards one another in such a way that a respective label is affixed to a circumferential subarea of a preform.

Due to the fact that both the transfer star wheel and the transfer device move the preforms and the labels towards one another, a complex movement can be carried out and a high throughput of bottles can be realized. The movement can be executed particularly fast and the transfer can be carried out with particular high reliability, since the label is only affixed to a circumferential subarea of the preform instead of being affixed to the whole circumference of the latter. In addition, excessive stretching of the label during blow molding is avoided in this way.

Preferably, the labeler additionally comprises a glue-application device for applying glue to a circumferential subarea of the preform and/or to a subarea of the label. It is thus possible to grade the adhesion effect in a particularly precise manner, so that the labels will be reliably introduced in the blow molds, where they can be correctly positioned or where they will migrate to the intended position on the bottle during blow molding.

According to a particularly advantageous embodiment of the labeler, the transfer star wheel comprises gripping arms, which move the preform in a direction perpendicular to its main axis towards the label so as to affix the label to the preform. It is thus possible to affix the label to the preform in a particularly controlled manner.

Preferably, the transfer device is configured such that it moves the label at least partially in a direction parallel to the main axis of the preform towards said preform so as to orient the label relative to the circumferential subarea of the preform before the label is affixed. Due to the fact that the transfer device executes a motion component parallel to the main axis, sleeve-shaped labels can be affixed in a particularly fast and reliable manner.

In the case of one embodiment, the transfer device rotates together with the transfer star wheel about a common axis. An additional star wheel acting as a transfer device is here not necessary.

In addition, the transfer device can be configured such that it moves the label at least partially in a direction perpendicular to the main axis of the preform towards said preform so as to affix the label to the preform. This allows a simpler structural design of the gripping mechanism of the transfer star wheel.

Preferably, the transfer device comprises a label holder supported on a lifting unit and provided with a fixing cage for sleeve-shaped labels. It is thus possible to affix the labels in a particularly reliable and reproducible manner.

According to one embodiment, the transfer device is a stationary dispenser for sleeve-shaped labels and is configured such that it shoots the label towards the preform so that the label will encompass the circumferential subarea at least partially. This variant is particularly space-saving and can easily be integrated in existing machines.

According to another embodiment, the transfer device is a rotatable cylinder with vacuum grippers or mechanical grippers. Making use of this rotatable cylinder, also planar labels can be affixed to the preform.

Preferably, the labeler additionally comprises a contact-pressure device for enlarging the adhesion area between the label and the preform. It is thus possible to increase the reliability of the glued joint.

The underlying technical problem is furthermore solved by a method for labeling plastic bottles, in particular in a rotary blow molder, making use of the labeler according to the present disclosure and comprising the following steps: affixing a label to a circumferential subarea of a preform; transferring the preform, equipped with the label, into a blow mold; and blow molding the preform, whereby the label will be applied to the bottle.

The affixing can be carried out rapidly and with high reliability, since the label is only affixed to a circumferential subarea of the preform. In addition, excessive stretching of the label during blow molding will be avoided in this way.

Preferably, the label is affixed with the aid of glue applied to a certain area or to certain areas of the preform and/or of the label. The adhesion effect can thus be graded in a particularly precise manner, so that the labels will be reliably introduced in the blow molds, where they can be correctly positioned or where they will migrate to the intended position on the bottle during blow molding.

According to another advantageous embodiment, the label is affixed by adhesion which is effective directly between the preform and the label. An additional application of glue will then not be necessary.

Preferably, the circumferential subarea of the preform encloses an angle of 180° at the most. It is thus possible that the label temporarily detaches itself from the preform during blow molding, so that it will migrate in the blow mold to the intended position.

According to a particularly advantageous embodiment of the method according to the present disclosure, the label is sleeve-shaped, and in step a): the preform is oriented relative to the label such that the main axis of the preform lies within the label; in step b): the label is moved at least partially parallel to the main axis of the preform so that, in the direction of the main axis, it will overlap with the circumferential subarea for affixing the label; and in step c): the preform and the label are moved towards one another perpendicular to the main axis, so that the label will be brought into contact with the preform.

BRIEF DESCRIPTION OF THE DRAWINGS

Preferred embodiments are shown in the drawing, in which:

FIG. 3a show a schematic side view of a lifting device with a label holder according to and 3b a second embodiment;

FIG. 4 shows a schematic representation of the functional principle of a third embodiment;

DETAILED DESCRIPTION OF THE PREFERRED EMBODIMENT

Figure 1:
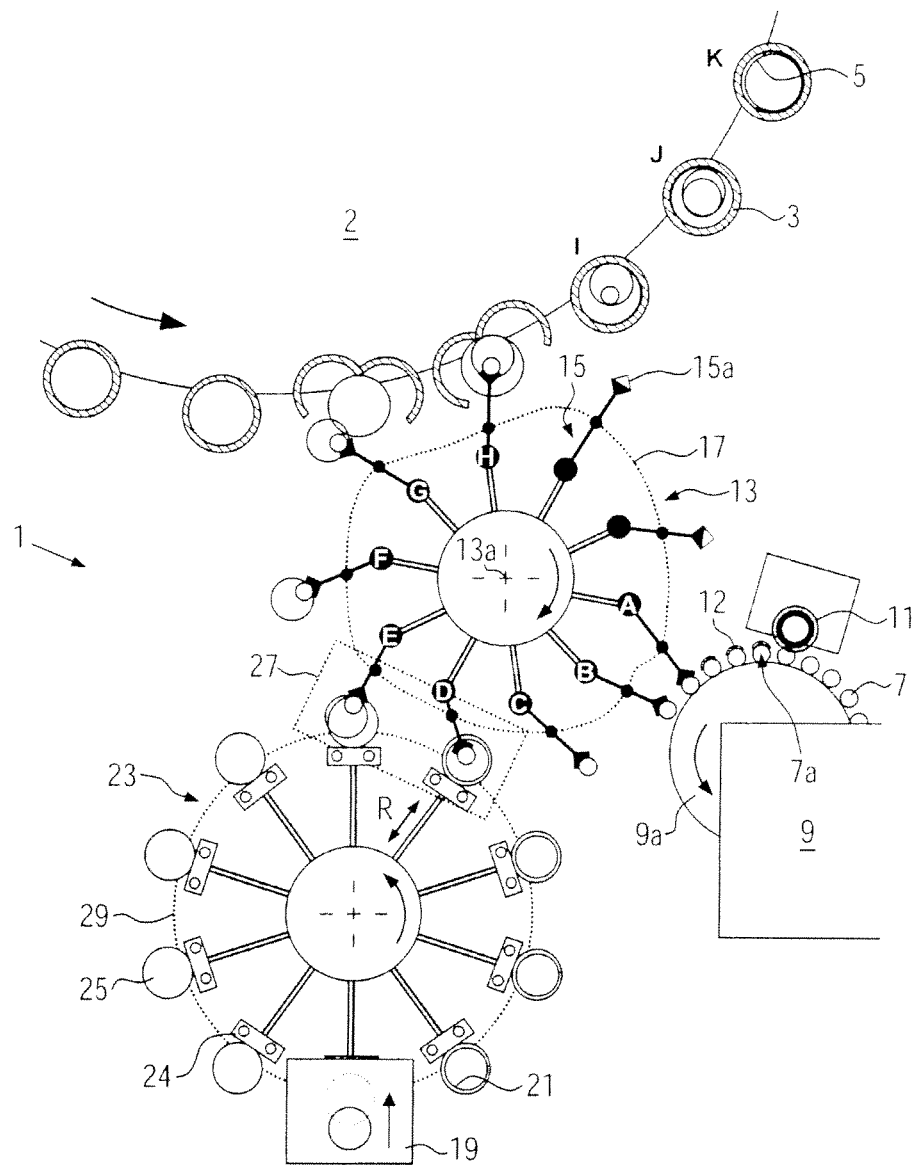
FIG. 1 shows a schematic top view of a first embodiment of the labeler.

As can be seen from FIG. 1, the first embodiment of the labeler 1 comprises a blow wheel 2 with a plurality of blown molds 3 for producing labeled bottles 5 or other plastic containers from preforms 7. The latter are heated in an oven 9 in the manner known, whereupon a circumferential subarea 7a of said preforms 7 has tangentially applied thereto a glue 12 by means of a gluing roller 11 and the preforms 7 are taken over by a transfer star wheel 13, pitch adaptation star wheel. On the circumference of said transfer star wheel 13 there are provided rotatably supported gripping arms 15, which are variable in length and which are equipped with grippers 15a for the preforms 7, as well as a first control cam 17 for controlling the gripping arms 15, in particular for adjusting the radial position and the track speed of the gripping arms 15.

In addition, there are provided at least one label dispenser 19, such as a sleeving unit for wrap-around labels 21 or label sleeves 21, and a preferably star-shaped transfer device 23 with label holders 25, which are fixed to lifting units 24 and used for attaching the labels 21 to the preforms 7 in a transfer region 27. The vertical position of the label holders 25 is determined by a second control cam 29.

Figure 2:
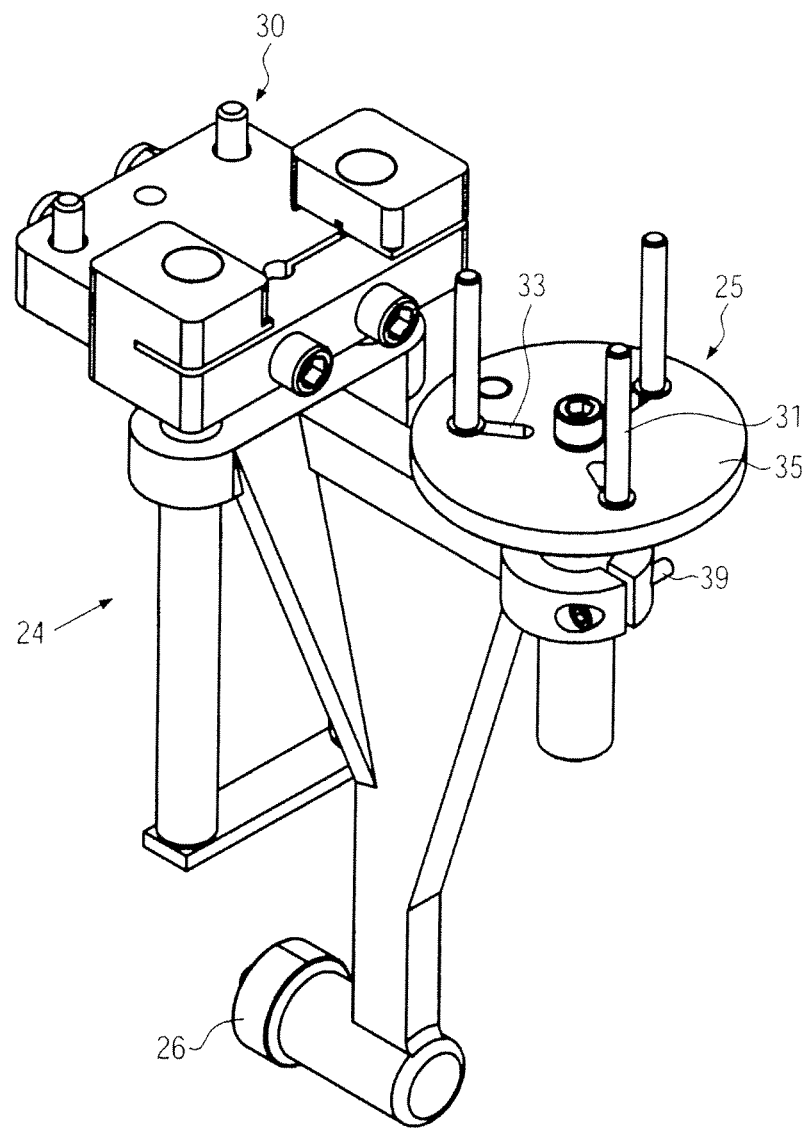
FIG. 2 shows a lifting device with a label holder according to the first embodiment.

The lifting units 24 are secured in position on the transfer device 23, e.g. via a clamping and guide unit 30 outlined in FIG. 2. The lifting movement is linear, i.e. the radial position (identified by arrow R in FIG. 3) of the label holders 25 on the transfer device 23 remains substantially unchanged. The control cam 29 lowers the label holder 25 with the guide roller 26 before or below the label dispenser 19 and raises it below the gripping arm 15.

The label holder 25 comprises an inner fixing cage 31 used for horizontally orienting the label 21 and consisting e.g. of pins that are axially adjustable on said holder 25 in elongated holes 33; in addition, the supporting surface 35 of the holder is preferably adapted to be vertically adjusted relative to the second control cam 29 and the guide roller 26, e.g. by means of a pin 39 that can be fixed in position. This allows an adaptation of the label holder 25 to different label sizes.

The mode of operation of the labeler 1 when the label 21 is being attached to the preform 7 and when both said components are being transferred to the blow mold 3 in common, is exemplarily shown in FIG. 1 on the basis of positions A to H of the gripping arms 15:

At position A, the gripper 15a takes hold of a preform 7, which has glue applied thereto on the circumferential subarea 7a, at a section which is free of glue, e.g. at the mouth of the preform 7 above the glue 12.

At positions B and C, the preform 7 is conducted to the transfer device 23, so that, as indicated at position D, the preform 7 will be positioned above a label 21 which has been lowered following the control cam 29. The rotary position of the preform 7 could here be additionally corrected so as to orient the glue-coated subarea 7a of the preform 7 relative to the label 21 and the gripping arm 15, respectively. In the example shown this is, however, not necessary, since the glue-coated preform 7 has already been correctly oriented with respect to its rotary position in the gripper 15a, viz. such that the glue-coated area 7a is directed towards the gripping arm 15 and the transfer star wheel 13, respectively.

At position D, i.e. in the transfer region 27, the grippers 15a substantially follow the track of the label holders 25 while the label holder 25 rises until the label 21 has been pushed over the preform 7 and the glue-coated area 7a is positioned fully within the label 21. Simultaneously, and/or subsequently, the gripping arm 15 is pivoted and/or drawn back such that it presses the glue-coated area 7a against the label 21, and thus attaches the label 21 to the preform 7. In the example shown, the glue-coated area 7a faces the gripping arm 15 and the transfer star wheel 13, respectively, so that the preform 7 is pressed against the label 21 primarily by drawing back the gripper 15a. The pressing of the preform 7 against the label 21 can be supported by a stop, by temporarily pinching the label 21 between the stop and the preform 7, said stop being is provided on the transfer star wheel 13 and being not shown in FIG. 1 for the sake of clarity.

Depending on the position of the location of adhesion between the preform 7 and the label 21, the gripping arm 15 may, however, also be moved in the opposite direction, i.e. away from the transfer star wheel 13 or substantially tangentially to the track of the label holders 25, in that the gripper 15a follows the label holder 25, at least in certain areas, with a higher or lower track speed until sufficient contact has been established between the preform 7 and the label 21.

It follows that the gripping arm 15 executes in the transfer region 27 predominantly a movement in a direction perpendicular to the main axis 7b of the preform 7 shown in FIG. 4, whereas the transfer device 23 primarily has the function of moving the label 21 in a direction parallel to the main axis 7b towards the preform 7 so as to vertically orient the label 21 before it is affixed. The motion components to be executed can arbitrarily be distributed to the gripping arms 15 and the transfer device 23, but in the interest of easy control it will be of advantage when the first control cam 17 controls the radial position and the track speed of the preforms 7 with the vertical position remaining constant and when the second control cam 29 controls the vertical position of the labels 21 with the track speed and the radial position remaining constant.

When the label 21 has been affixed to the preform 7, the gripper 15a follows the circular track of the label holder 25 while the latter is lowered again, at least until the fixing cage 31 is positioned fully below the label 21. As shown at position E, the gripping arm 15 can then be pivoted away from the track of the label holder 25.

At positions F to H, the preform 7 and the label 21 are fed, in common, to an opened blow mold 3, where the preform 7 is blow molded, possibly after having been stretched.

Positions I to K additionally indicate the blow molding of the bottle 5; during the blow molding process, the label 21 will migrate to the bottle location to be labeled due to stretching. The label 21 will preferably be configured such that its diameter is slightly smaller than that of the fully blown bottle 5, so that the label 21 will closely fit to the bottle also at the location with the smallest bottle diameter or will be slightly stretched in diameter. It follows that it is primarily the elongation that holds the label 21 on the fully blown bottle 5.

Depending on the speed with which the process take place, the deceleration of the label holder 25 during braking at the upper position of the lifting unit 24 may be so high that additional vertical fixing of the label 21 on the label holder 25 will be of advantage so as to prevent the label 21 e.g. from deforming or from becoming detached from the label holder 25 and being shot against the gripping arm 15. Suitable means for such vertical fixing would e.g. be a hinged cover (not shown), which is swiveled in position only during lifting and deceleration, and which is provided with suitable openings for the preform 7 and the gripping arm 15.

The glue 12 may e.g. be a temperature-sensitive or pressure-sensitive glue and it may be applied before, within or after the oven 9. The glue is preferably applied directly at the discharge wheel 9a of the oven 9 by means of a special gluing roller 11 tangentially to the surface of the preform 7, e.g. similar to the application of glue from the glue pallets of a conventional cold-glue unit, or in a contact-free manner by spraying on the glue in a clocked mode of operation. The amount of glue applied and the size of the glue-coated area 7a depend on the intended fit and on the nature of the label 21 used as well as on the preform 7.

The glue-coated area comprises preferably a circumferential subarea 7a of the preform 7 of e.g. 180° at the most, in particular of 90° at the most, or, depending on the respective case of use, of only 45°, so that only a subarea 21a (cf. FIG. 5) of the affixed label 21 will be in contact with the preform 7. This has the effect that material will be saved and that the fit of the label 21 on the fully blown bottle 5 will be optimized. Depending on the nature of the label 21, a deviating circumferential subarea 7a may, however, be of advantage as well. Alternatively, the label 21 may also be affixed to the preform 7 without making use of the glue 12, e.g. by direct adhesion of the label 21 on the heated preform 7. Label materials that are suitable for this purpose are e.g. PET and pre-stretched PP.

In the following, further embodiments of the present disclosure will be described; in so doing, features which the respective embodiments have in common and which have already been described hereinbefore will not be described once more. Likewise, individual features of the embodiments may be combined with one another.

FIGS. 3a and 3b show a second embodiment in which the transfer device 40 with the lifting device 41, the label holder 25 and the second control cam 29 are arranged on the transfer star wheel 13, in particular below the gripping arms 15. In view of the fact that the transfer device 40 and the transfer star wheel 13 are coupled and rotate about the common axis 13a, the separate transfer star wheel of the transfer device 23 according to the first embodiment is not required. The lifting device 41 is configured as a parallel lever, which is shown in FIG. 3a at a lowered position below the label dispenser 19 and in FIG. 3b at a raised position below the gripping arm 15 while the label 21 is being applied to the preform 7 by means of contact pressure. When the label holder 25 is raised by means of the second control cam 29, the label 21 will simultaneously move radially inwards (identified by arrow R). This has the effect that the label holder 25 presses the label 21 with the aid of a stop 33 against the glue-coated area of the preform 7, said area facing here away from the transfer star wheel 13.

FIG. 4 shows, at three successive moments in time $T_1$ to $T_3$, a gripper 15a and a label dispenser 19 of a third embodiment, in which the transfer device 42 for the labels 21 is arranged in a stationary manner on the label dispenser 19 or integrated in a label dispenser 19, e.g. in a sleeving unit. The transfer device 42 comprises e.g. a friction wheel drive for the labels 21. Also in this case, the additional transfer star wheel of the transfer device 23 shown in FIG. 1 can be dispensed with. Instead, the transfer device 42 is arranged below the track of the glue-coated preforms 7 held by the grippers 15a. The transfer device 42 is configured such that it shoots the label 21 upwards at a moment in time $T_1$ at which the preform 7 is located above the label sleeve 21. The moment in time $T_1$ and the speed of the label 21 are coordinated with the movement of the preform 7 (cf. the horizontal arrows) such that the label sleeve 21 will slip over the preform 7 (cf. $T_2$) and encompass the glue-coated label area at the moment in time $T_3$. Due to the relative movement between the gripper 15a and the label dispenser 19 as well as due to the inertia of the label 21, the latter is pressed against the glue 12 and affixed to the preform 7 in this way. If necessary, the strength and the area of the glued joint can be increased still further by subsequently blowing air onto the label or by applying brushes thereto (not shown).

This embodiment takes up particularly little space. The components required can, moreover, be easily retrofitted.

Figure 5:
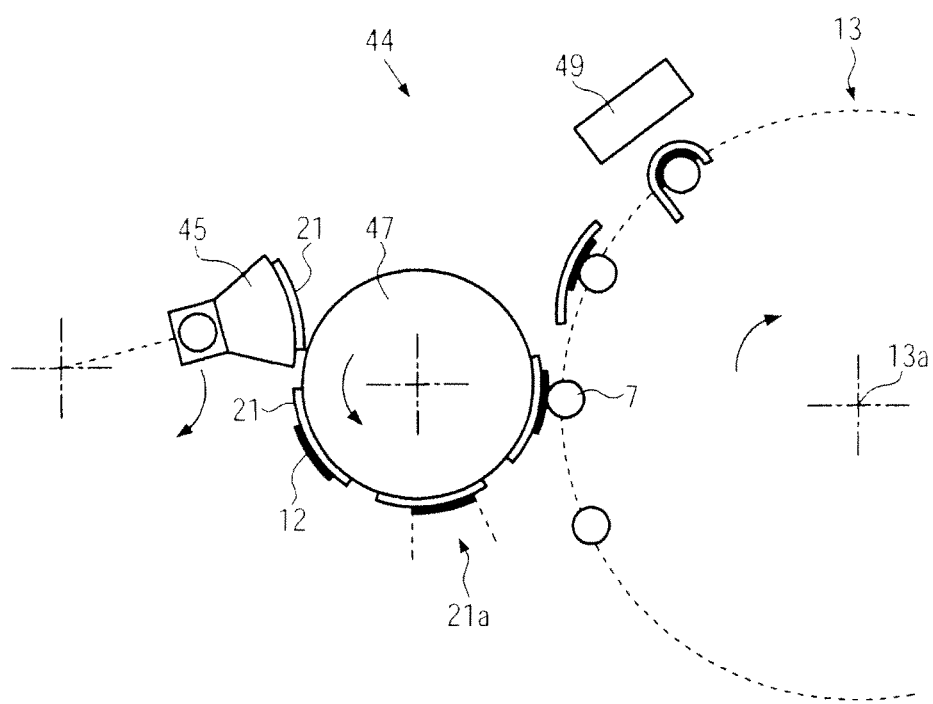
FIG. 5 shows a schematic fragmentary view of a fourth embodiment.

FIG. 5 shows a fourth embodiment in the case of which planar labels 21, instead of label sleeves, are affixed to the preform 7 by means of the transfer device 44. In contrast to the preceding embodiments, the label 21 is here preferably coated with the glue 12 in a certain area or in certain areas thereof. The label 21 is removed from a magazine (not shown)

by means of a palette 45 of a conventional glue pallet carousel and transferred to a turning and transfer device 47, e.g. to a conventional cylinder with vacuum grippers or mechanical grippers. The turning and transfer device 47 conducts the labels 21 tangentially along the transfer star wheel 13 and the gripping arms 15 (not shown) press a respective preform 7 against a glue-coated area 21a of the label 21, thus affixing the labels 21 to the preforms 7. If necessary, the strength and the area of the glued joint can be increased still further by means of a contact-pressure device 49, e.g. by blowing air onto the label or by applying brushes thereto.

Alternatively, it is also possible to use self-gluing labels 21 stored on a wound carrier strip (not shown). Preferably, the self-gluing labels 21 have slue applied thereto only in a subarea 21a. Instead of making use of a glue pallet carousel and of the turning device 47, the labels 21 are pulled with the carrier strip across a peel-off edge in the manner known and are thus separated from the carrier strip; subsequently, the glue-coated subareas 21a are pressed against a respective preform 7, which has the effect that the labels 21 will be affixed to the preform 7. For improved fixing, also the self-gluing label 21 can then be pressed against the preform 7 over a larger area by blowing air onto the label or by applying brushes thereto. It is thus possible to introduce also planar labels 21 together with the preform 7 into the blow mold 3.

The invention claimed is:

1. A labeler for labeling plastic bottles in the blow mold, comprising a plurality of blow molds; a transfer star wheel for introducing preforms and labels affixed thereto into the blow molds; and at least one transfer device for transferring the labels to the preforms, and both the transfer star wheel and the transfer device move the preforms and the labels towards one another in a transfer region in such a way that a respective label is adhesively affixed only to a circumferential subarea of a preform so that only a subarea of the affixed label is in contact with the preform.

2. A labeler according to claim 1, and a glue-application device for applying glue to the circumferential subarea of the preform and/or to the subarea of the label.

3. A labeler according to claim 1, wherein the transfer star wheel comprises gripping arms which move the preform in a direction perpendicular to a main axis thereof towards the label so as to affix the label to the preform.

4. A labeler according to claim 1, wherein the transfer device is configured such that it moves the label at least partially in a direction parallel to a main axis of the preform towards said preform so as to orient the label relative to the circumferential subarea of the preform before the label is affixed.

5. A labeler according to claim 1, wherein the transfer device rotates together with the transfer star wheel about a common axis.

6. A labeler according to claim 1, wherein the transfer device moves the label at least partially in a direction perpendicular to a main axis of the preform towards said preform so as to affix the label to the preform.

7. A labeler according to claim 1, wherein the transfer device comprises a label holder supported on a lifting unit and provided with a fixing cage for sleeve-shaped labels.

8. A labeler according to claim 1, wherein the transfer device is a stationary dispenser for sleeve-shaped labels and is configured such that it shoots the label towards the preform so that the label will encompass the circumferential subarea.

9. A labeler according to claim 1, wherein the transfer device is a rotatable cylinder with vacuum grippers or mechanical grippers.

10. A labeler according to claim 1, and a contact-pressure device for enlarging the adhesion area between the label and the preform.

11. A labeling method for labeling plastic bottles, making use of the labeler according to claim 1, and comprising:
    a) affixing a label to a circumferential subarea of a preform so that only a subarea of the affixed label is in contact with the preform;
    b) transferring the preform, equipped with the label, into a blow mold; and
    c) blow molding the preform, whereby the label will be applied to the bottle.

12. A method according to claim 11, and affixing the label with the aid of a glue applied to a certain area or to certain areas of the preform and/or of the label.

13. A method according to claim 11, and affixing the label by adhesion which is effective directly between the preform and the label.

14. A method according to claim 11, and wherein the circumferential subarea of the preform encloses an angle of 180° at the most.

15. A method according to claim 11, and wherein the label is sleeve-shaped and that in step a): the preform is oriented relative to the label such that the main axis of the preform lies within the label; in step b): the label is moved at least partially parallel to the main axis of the preform so that, in the direction of the main axis, it will overlap with the circumferential subarea for affixing the label; and in step c): the preform and the label are moved towards one another perpendicular to the main axis, so that the label will be brought into contact with the preform.

16. The labeler according to claim 1, wherein the blow mold is a rotary blow molder.

17. The labeling method according to claim 11, wherein the plastic bottles being labeled are formed in a rotary blow molder.

18. The labeler according to claim 1, and an oven heating the preforms for direct adhesion of the label on a heated perform.

19. The labeler according to claim 2, wherein the glue-application device applies the glue on the circumferential subarea of the preform enclosing an angle of 180° at the most.

* * * * *